(12) United States Patent
Park et al.

(10) Patent No.: US 11,216,147 B2
(45) Date of Patent: Jan. 4, 2022

(54) ELECTRONIC DEVICE AND CONTENT DISPLAY METHOD

(71) Applicant: Samsung Electronics Co., Ltd., Suwon-si (KR)

(72) Inventors: Soyoung Park, Suwon-si (KR); Sangil Lee, Suwon-si (KR); Younghak Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/975,524

(22) PCT Filed: Mar. 15, 2019

(86) PCT No.: PCT/KR2019/003009
§ 371 (c)(1),
(2) Date: Aug. 25, 2020

(87) PCT Pub. No.: WO2019/177411
PCT Pub. Date: Sep. 19, 2019

(65) Prior Publication Data
US 2021/0004127 A1    Jan. 7, 2021

(30) Foreign Application Priority Data
Mar. 15, 2018 (KR) ........................ 10-2018-0030444

(51) Int. Cl.
*G06F 3/0481* (2013.01)
*G06F 3/0484* (2013.01)
*G06F 3/0485* (2013.01)

(52) U.S. Cl.
CPC ........ *G06F 3/0481* (2013.01); *G06F 3/04842* (2013.01); *G06F 3/04855* (2013.01); *G06F 2203/04803* (2013.01)

(58) Field of Classification Search
CPC .. G06F 3/0481; G06F 3/0482; G06F 3/04855; G06F 2203/04803
See application file for complete search history.

(56) References Cited

U.S. PATENT DOCUMENTS 6,204,846 B1 *  3/2001  Little .................. G06F 3/04855
                                                      715/784
7,401,298 B1   7/2008  Sexton et al.
(Continued)

FOREIGN PATENT DOCUMENTS

JP     2009-009255 A    1/2009
KR  10-2016-0004929 A   1/2016
(Continued)

OTHER PUBLICATIONS

European Search Report dated Mar. 5, 2021, issued in European Patent Application No. 19766652.2.

*Primary Examiner* — Mong-Shune Chung
(74) *Attorney, Agent, or Firm* — Jefferson IP Law, LLP

(57) ABSTRACT

According to various embodiments of the disclosure, an electronic device may include a display, a communication circuit transmitting and receiving data with an external server, a memory storing data received through the communication circuit, and a processor controlling the display, the communication circuit, and the memory. The processor may be configured to receive a first portion of content capable of being displayed through the display, and index information of the content from the external server, to display at least part of the first portion in a first region of the display, to display a user interface for content movement based on the index information, in a second region of the display, to make a request for a second portion of the content corresponding to the user input to the external server when a specified user
(Continued)

input occurs in the user interface, and to display at least part of the second portion in the first region of the display.

17 Claims, 12 Drawing Sheets

(56) References Cited

U.S. PATENT DOCUMENTS

| | | | |
|---|---|---|---|
| 8,775,506 B2 | 7/2014 | Evans et al. | |
| 8,965,963 B2 | 2/2015 | Evans et al. | |
| 9,569,085 B2 | 2/2017 | Park et al. | |
| 10,241,994 B2 | 3/2019 | Sathish et al. | |
| 2002/0186252 A1* | 12/2002 | Himmel | G06F 3/04855 715/787 |
| 2003/0231196 A1* | 12/2003 | Keohane | G06F 3/04855 715/700 |
| 2011/0258577 A1* | 10/2011 | Steelberg | G06F 3/04855 715/786 |
| 2013/0103738 A1 | 4/2013 | Evans et al. | |
| 2014/0013243 A1* | 1/2014 | Flynn, III | G06F 16/447 715/753 |
| 2014/0289673 A1 | 9/2014 | Evans et al. | |
| 2015/0012877 A1* | 1/2015 | Lee | G06F 3/0488 715/786 |
| 2015/0304714 A1 | 10/2015 | Park et al. | |
| 2016/0004779 A1 | 1/2016 | Sathish et al. | |
| 2016/0070425 A1 | 3/2016 | Song et al. | |
| 2016/0170630 A1 | 6/2016 | Park et al. | |
| 2017/0090743 A1* | 3/2017 | Schaller | G06F 3/04855 |
| 2017/0269800 A1* | 9/2017 | Park | G06F 3/0488 |
| 2019/0026017 A1 | 1/2019 | Lee et al. | |

FOREIGN PATENT DOCUMENTS

| | | |
|---|---|---|
| KR | 10-2016-0029510 A | 3/2016 |
| KR | 10-2016-0071626 A | 6/2016 |
| KR | 10-2017-0026010 A | 3/2017 |
| KR | 10-2017-0086798 A | 7/2017 |
| KR | 10-2017-0106787 A | 9/2017 |

* cited by examiner

ELECTRONIC DEVICE AND CONTENT DISPLAY METHOD

CROSS-REFERENCE TO RELATED APPLICATION(S)

This application is a U.S. National Stage application under 35 U.S.C. § 371 of an International application number PCT/KR2019/003009, filed on Mar. 15, 2019, which is based on and claims priority of a Korean patent application number 10-2018-0030444, filed on Mar. 15, 2018, in the Korean Intellectual Property Office, the disclosure of each of which is incorporated by reference herein in its entirety.

TECHNICAL FIELD

Various embodiments of the disclosure relate to an electronic device and a method of displaying content on a display.

BACKGROUND ART

An electronic device such as a smartphone, a tablet PC, a laptop PC, or a desktop PC may provide users with various pieces of information through a display. For example, the electronic device may execute various types of applications and may display an execution screen of an application on the display.

The electronic device may also receive data from an external server and may display the data on the display. The electronic device may display content such as texts, still images, or videos on the display based on the data received from the external server.

For example, when an SNS application is executed, the electronic device may receive and display a part of SNS messages including recently-uploaded text, image, and video. When a user generates a swipe input to scroll down a screen, or when the user touches and moves a scroll box of a scroll bar, the previously-uploaded SNS message may be displayed on the display.

DISCLOSURE

Technical Problem

When a large amount of content is stored on an external server, the conventional electronic device receives some pieces of data of content from the external server and displays the data on a display. When there is an additional request of a user, the electronic device additionally receives a part of other pieces of data of the content and displays the part of other pieces of data on the display. In this case, index information about the content is restrictively displayed on the portion received from the electronic device; when a user desires to identify other portions of the contact, the user needs to move a scroll by repeatedly generating an input.

Technical Solution

According to various embodiments of the disclosure, an electronic device may include a display, a communication circuit transmitting and receiving data with an external server, a memory storing data received through the communication circuit, and a processor controlling the display, the communication circuit, and the memory. The processor may be configured to receive a first portion of content capable of being displayed through the display, and index information of the content from the external server, to display at least part of the first portion in a first region of the display, to display a user interface for content movement based on the index information, in a second region of the display, to make a request for a second portion of the content corresponding to the user input to the external server when a specified user input occurs in the user interface, and to display at least part of the second portion in the first region of the display.

Advantageous Effects

According to various embodiments of the disclosure, an electronic device may receive a part of content from a server and may receive index information of a range larger than the part of the received content. The electronic device may distinguish and display a region receiving content and a region not receiving the content based on the received index information.

According to various embodiments of the disclosure, the electronic device may receive additional index information in response to a user input and then may quickly move to the location desired by a user in the large amount of content.

According to various embodiments of the disclosure, the electronic device may receive the data of the portion desired by the user in the large amount of content stored in an external server, thereby reducing data communication cost.

MODE FOR INVENTION

Figure 1:
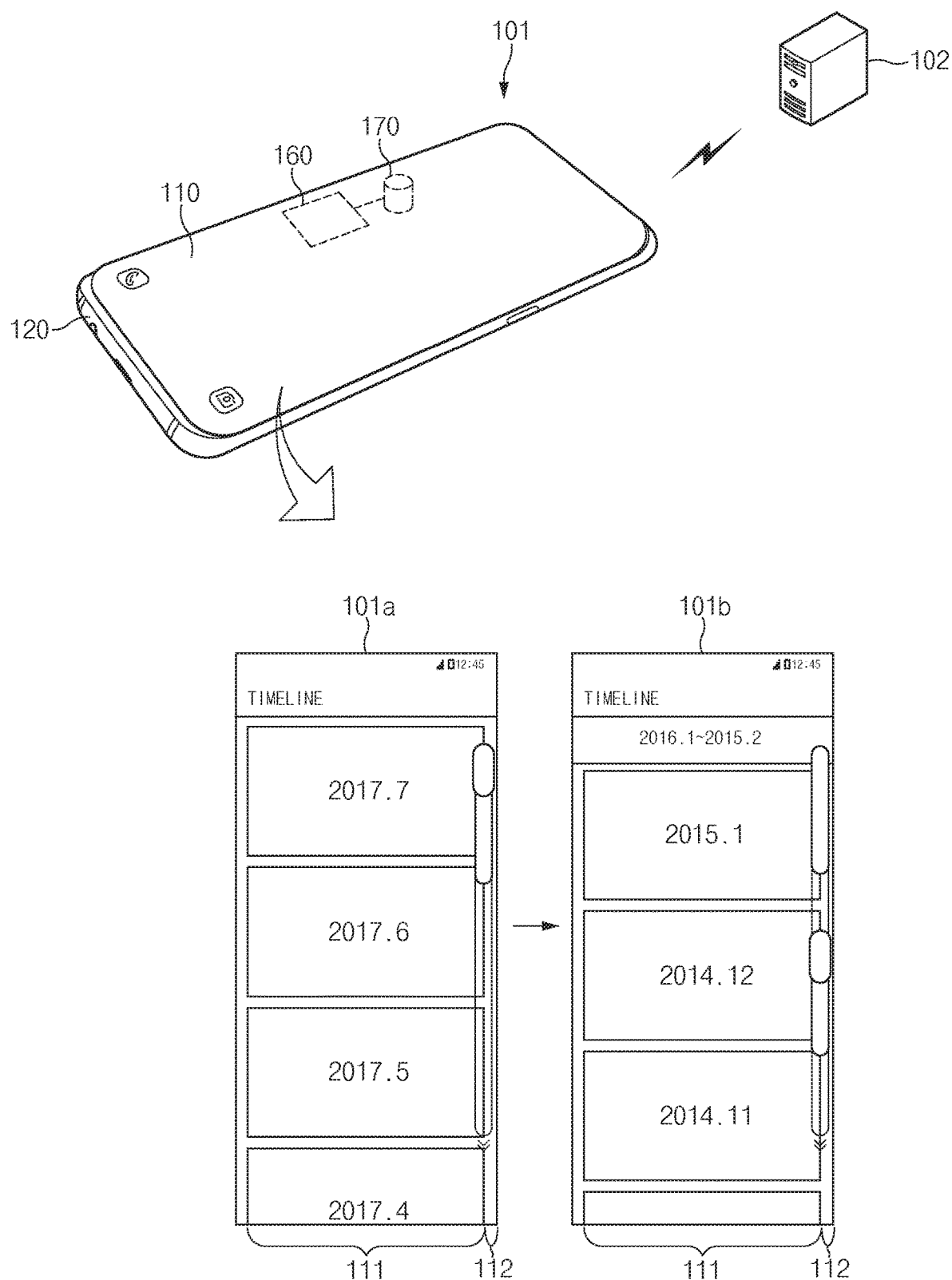
FIG. 1 illustrates an electronic device, according to various embodiments.

Various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure. With regard to description of drawings, similar components may be marked by similar reference numerals.

In the disclosure disclosed herein, the expressions "have", "may have", "include" and "comprise", or "may include" and "may comprise" used herein indicate existence of corresponding features (for example, elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments of the present disclosure, but do not limit the elements. For example, such terms are used only to distinguish an element from another element and do not limit the order and/or priority of the elements. For example, a first user device and a second user device may represent different user devices irrespective of sequence or importance. For example, without departing the scope of the present disclosure, a first element may be referred to as a second element, and similarly, a second element may be referred to as a first element.

It will be understood that when an element (for example, a first element) is referred to as being "(operatively or communicatively) coupled with/to" or "connected to" another element (for example, a second element), it can be directly coupled with/to or connected to the other element or an intervening element (for example, a third element) may be present. In contrast, when an element (for example, a first element) is referred to as being "directly coupled with/to" or "directly connected to" another element (for example, a second element), it should be understood that there are no intervening element (for example, a third element).

According to the situation, the expression "configured to" used herein may be used as, for example, the expression "suitable for", "having the capacity to", "designed to", "adapted to", "made to", or "capable of". The term "configured to (or set to)" must not mean only "specifically designed to" in hardware. Instead, the expression "a device configured to" may mean that the device is "capable of" operating together with another device or other components. CPU, for example, a "processor configured to (or set to) perform A, B, and C" may mean a dedicated processor (for example, an embedded processor) for performing a corresponding operation or a generic-purpose processor (for example, a central processing unit (CPU) or an application processor) which may perform corresponding operations by executing one or more software programs which are stored in a memory device.

Terms used in this specification are used to describe specified embodiments of the present disclosure and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

An electronic device according to various embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), MP3 players, mobile medical devices, cameras, and wearable devices. According to various embodiments of the present disclosure, the wearable devices may include accessories (for example, watches, rings, bracelets, ankle bracelets, glasses, contact lenses, or head-mounted devices (HMDs)), cloth-integrated types (for example, electronic clothes), body-attached types (for example, skin pads or tattoos), or implantable types (for example, implantable circuits).

Hereinafter, electronic devices according to an embodiment of the present disclosure will be described with reference to the accompanying drawings. The term "user" used herein may refer to a person who uses an electronic device or may refer to a device (for example, an artificial electronic device) that uses an electronic device.

FIG. 1 illustrates an electronic device, according to various embodiments. An embodiment is exemplified in FIG. 1 as an electronic device 101 is a mobile device such as a smart phone, but is not limited thereto. For example, the electronic device 101 may be a tablet PC, a laptop PC, or a desktop PC.

Referring to FIG. 1, the electronic device 101 may include a display 110 and a housing (or body) 120.

The display 110 may display content such as a text or an image (e.g., an icon, a still image, or a video). The display 110 may display the execution screens of various applications. For example, the display 110 may display the execution screen of an SNS app.

The display 110 may receive a touch input. For example, in the SNS app, when a user's swipe input occurs on the display 110, the content associated with a swipe input may be displayed on the display 110.

The housing (or body) 120 may fix the display 110 and may protect various internal components. A button, a sensor window, a speaker, or a camera may be mounted on the outside surface of the housing 120. The housing (or body) 120 may include various components, which are necessary to drive the electronic device 101, such as a processor 160, a memory 170, a communication circuit (not illustrated), or a battery (not illustrated) therein.

The processor 160 may perform various data processing and calculation for driving the electronic device 101. The processor 160 may execute various applications which may be executed at the electronic device 101 and may process a relevant operation.

In a screen 101a and a screen 101b, the processor 160 may receive content (e.g., texts, images, videos, or the like) from an external server 102 to display the content in a first region 111 (e.g., a central region excluding a part of the side surface) of the display 110. For example, the processor 160 may execute an SNS app. When the SNS app is executed, the processor 160 may make a request for the content (e.g., texts, images, videos, or the like) previously uploaded by a user to the external server 102 based on user account information. The processor 160 may display the content received from the external server 102 in the first region 111 of the display 110.

According to various embodiments, the processor 160 may receive index information from the external server 102. The index information may be information extracted from metadata of content stored in the external server 102. For example, the index information may include information about a time at which SNS articles stored in the external server 102 have been uploaded.

According to various embodiments, the processor 160 may receive index information of a wider range than a portion corresponding to the first portion of the content received from the external server 102. For example, when the processor 160 receives content in 2017 from the external server 102, the index information may include an index for content from 2015 to 2017.

According to various embodiments, the processor 160 may display a user interface (e.g., a scroll bar) based on the index information received in the second region 112 of the display 110. The second region 112 may be a side region (e.g., right side surface) of the display 110. According to an embodiment, the second region 112 may be an edge region in which the display 110 extends to the side surface of the electronic device 101.

The processor 160 may process a user input to change the content displayed in the first region 110 through a user interface (e.g., a scroll bar).

According to various embodiments, the processor 160 may distinguish and display a data receiving region and a data non-receiving region on the user interface (e.g., a scroll bar). The data receiving region may indicate a section where the content is received from the external server 102. The data non-receiving region may indicate a section where the content is not received from the external server 102. The processor 160 may change the sizes of the data receiving region and the data non-receiving region or may add the data receiving region in response to a user input generated on the user interface. Additional information about the user interface may be provided through FIGS. 2 to 11.

The memory 170 may store data necessary for an operation of the electronic device 101. For example, the memory 170 may store data information about the execution of an application installed at the electronic device 101. In an embodiment, the memory 170 may store data of content received from the external server 102. In addition, the memory 170 may store index information received from the external server 102.

The communication circuit (or communication module) (not illustrated) may communicate with an external electronic device (e.g., the external server 102). The communication circuit (not illustrated) may support direct communication between devices or communication using a separate relay device (e.g., AP or base station).

Figure 2:
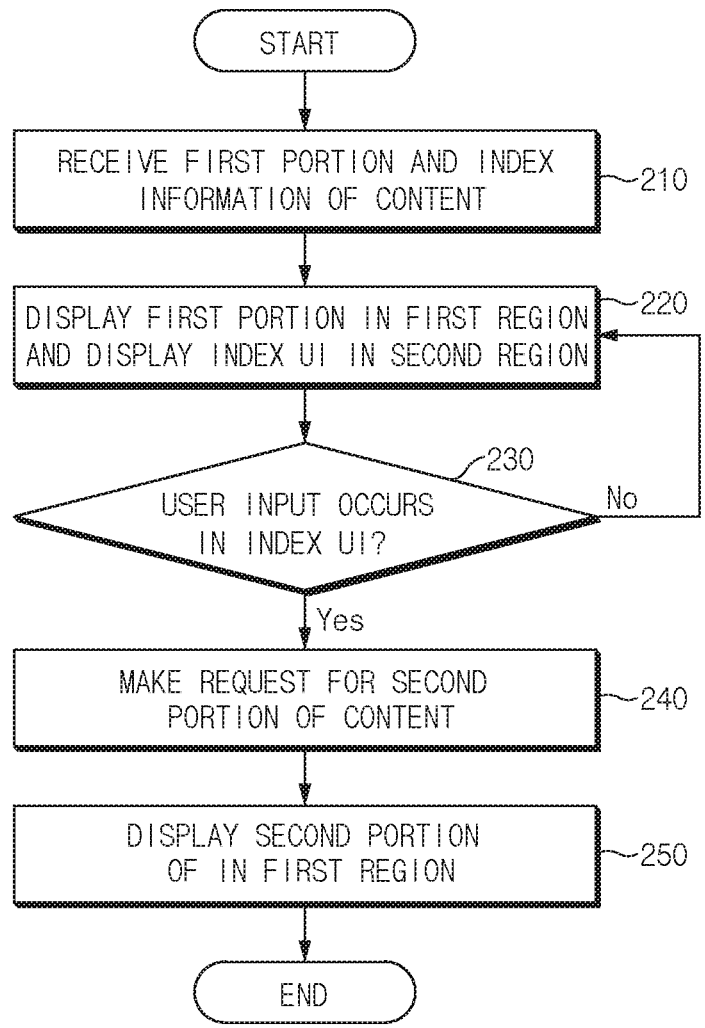
FIG. 2 illustrates a method of displaying content according to various embodiments.

FIG. 2 illustrates a method of displaying content according to various embodiments.

Referring to FIG. 2, in operation 210, the processor 160 may receive a first portion and index information of content from the external server 102. The index information may include index information corresponding to the first portion of the content, and may additionally include index information corresponding to another portion of content that is continuous to the first portion. For example, the first portion of the content may be data of SNS messages uploaded during the last month, and the index information may include metadata about data of SNS messages uploaded during the last year.

In operation 220, the processor 160 may display at least part of the received first portion in the first region 111 of the display 110 and may display a user interface (hereinafter, referred to as an index UI)(e.g., a scroll bar) for screen movement in the second region 112 of the display 110 based on the index information. For example, the first region 111 may be a central region other than a part of the side surface of the display 110. The second region 112 may be a side region (e.g., a part of a right side or a part of a lower side) of the display 110.

According to various embodiments, in the index UI, the processor 160 may distinguish and display a region receiving content data (hereinafter, a reception region) and a region not receiving content data (hereinafter, a non-reception region). For example, in the index UI, the processor 160 may display a reception region in a first color (e.g., white) and may display a non-reception region in a second color (e.g., gray). The processor 160 may display a region corresponding to the first portion of the index UI in a first color (e.g., white) set for the reception region.

In operation 230, the processor 160 may determine whether a specified user input occurs in the index UI. For example, the user input may be an input to touch and move a scroll box (or scroll thumb) on a scroll bar and to terminate the touch.

In operation 240, the processor 160 may make a request for data for the second portion of the content to the external server 102 in response to a user input. According to an embodiment, the first portion and the second portion are not continuous and may be data separate from each other. For example, the first portion may be SNS messages uploaded in 2017. The second portion may be SNS messages uploaded in 2015. SNS messages separately uploaded in 2016 may be stored in the external server 102 between the first portion and the second portion.

In operation 250, the processor 160 may display at least part of the second portion of the content in the first region 111 of the display 110. In an embodiment, the processor 160 may display a region corresponding to the second portion in the index UI in a first color (e.g., white) set for the reception region.

Figure 3:
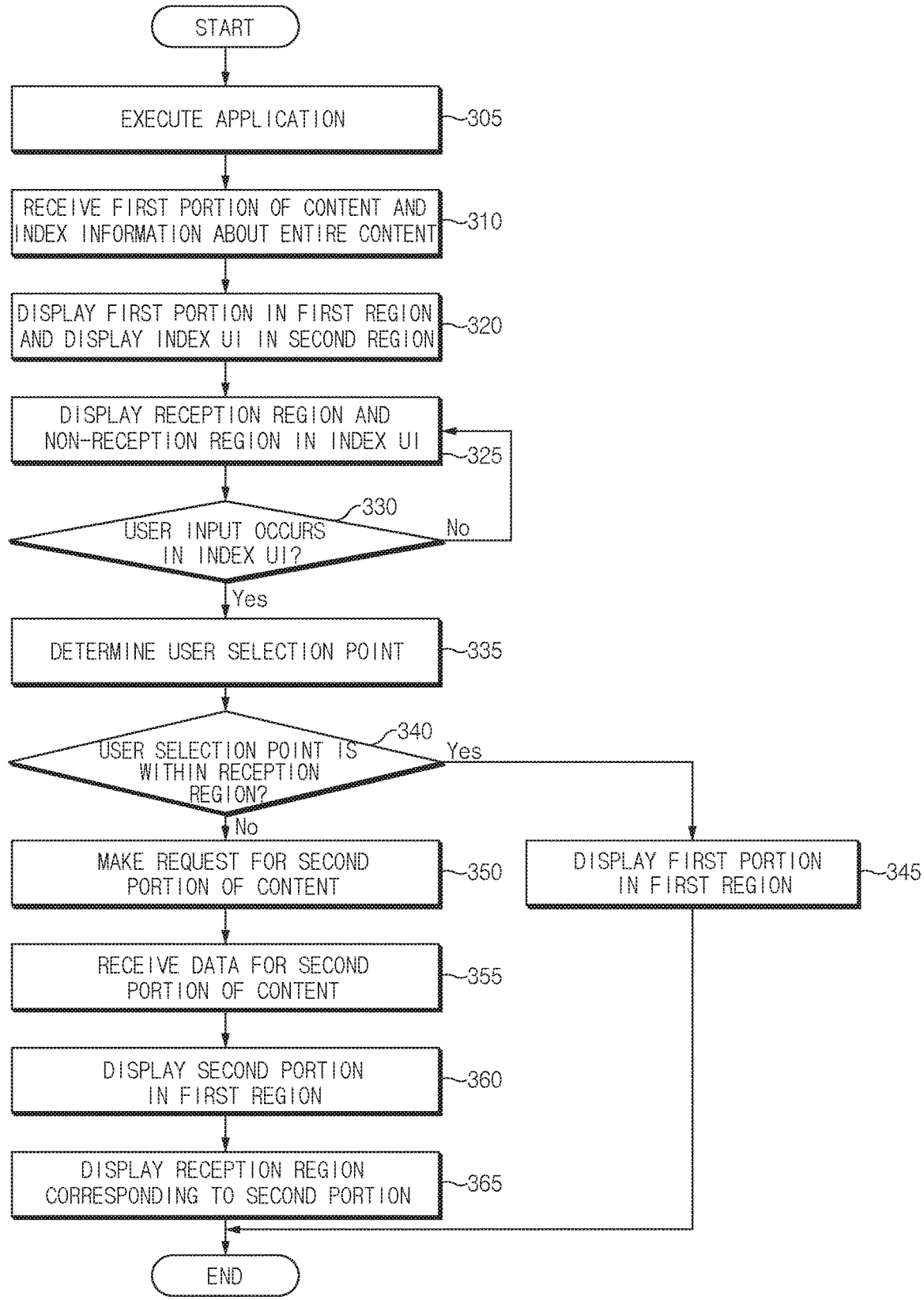
FIG. 3 is a flowchart illustrating a content displaying method for displaying index information of entire content according to various embodiments.

FIG. 3 is a flowchart illustrating a content displaying method for displaying index information of entire content according to various embodiments.

Referring to FIG. 3, in operation 305, the processor 160 may execute an application that receives and processes content (e.g., texts, images, or videos) from the external server 102. According to an embodiment, the content may be data sorted depending on a specified condition. For example, the content may be data sorted depending on criteria such as a time, score, and price.

In operation 310, the processor 160 may receive the first portion of the content and index information about the entire content from the external server 102.

The index information may include not only index information corresponding to the first portion of the content, but also index information about the entire content stored in the server 102. For example, when SNS messages for a total of 10 years are stored in the server 102, the index information may include metadata extracted from each of the SNS messages for 10 years.

In operation 320, the processor 160 may display at least part of the received first portion in the first region 111 of the display 110 and may display an index UI (e.g., a scroll bar)

for screen movement in the second region 112 of the display 110 based on index information. For example, the first region 111 may be a central region other than a part of the side surface of the display 110. The second region 112 may be a side region (e.g., a part of a right side or a part of a lower side) of the display 110.

In operation 325, the processor 160 may distinguish and display a reception region and a non-reception region in the index UI. For example, the processor 160 may display the reception region in the index UI in a first color (e.g., white), and may display the non-reception region in the index UI in a second color (e.g., gray). The processor 160 may display a portion corresponding to the first portion of the index UI in a first color (e.g., white) set for the reception region.

In operation 330, the processor 160 may determine whether a specified user input occurs in the index UI. For example, the user input may be an input to touch and move a scroll box on a scroll bar and to terminate the touch.

In operation 335, the processor 160 may determine the user selection point determined by the user input. The user selection point may include information about the location of content to be displayed by a user, in the first region 111 of the display 110 through the index UI.

For example, the user selection point may be index information corresponding to a point at which the scroll box is stopped when the user touches and moves a scroll box in the index UI, and then terminates the touch.

In operation 340, the processor 160 may determine whether the user selection point is within the reception region.

In operation 345, when the user selection point is within the reception region, the processor 160 may display the corresponding content, using the first portion stored in the memory 170 inside the electronic device 101.

In operation 350, when the user selection point is out of the reception region (or when the user selection point is within the non-reception region), the processor 160 may make a request for data for the second portion of the content to the external server 102. The second portion may be data corresponding to the user selection point.

In operation 355, the processor 160 may receive data for the second portion corresponding to the user selection point from the external server 102. In an embodiment, the second portion may be data that is not continuous with data of the first portion of the content received in operation 310. For example, the first portion may be SNS messages uploaded in 2017. The second portion may be SNS messages uploaded in 2015. SNS messages separately uploaded in 2016 may be stored in the external server 102 between the first portion and the second portion.

In operation 360, the processor 160 may display at least part of the second portion received from the external server 102, in the first region 111 of the display 110.

In operation 365, the processor 160 may display the reception region corresponding to the second portion, in the index UI. For example, the processor 160 may change the region, which corresponds to the second portion, in the index UI from gray set for the non-reception region to white set for the reception region.

Figure 4:
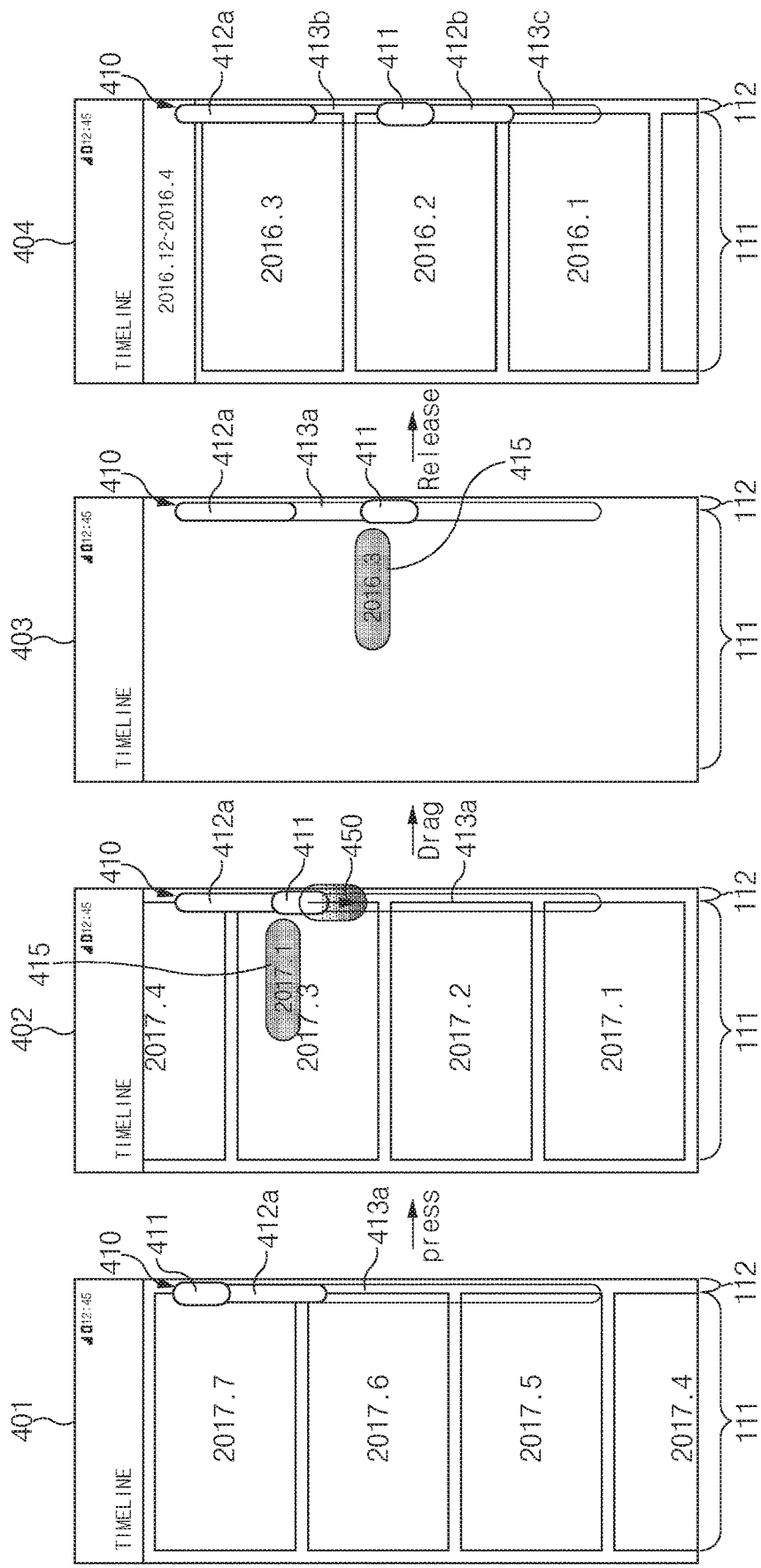
FIG. 4 is an exemplary view of a screen of displaying index information of entire content according to various embodiments.

FIG. 4 is an exemplary view of a screen of displaying index information of entire content according to various embodiments. FIG. 4 is, but is not limited to, an example.

Referring to FIG. 4, in a first screen 401, the processor 160 may display a first portion of content received from the external server 102, in the first region 111 of a display. The processor 160 may preferentially receive a first portion, which is a part of content stored in the external server 102, and may provide the first portion to a user. The first region 111 may be a central region of the display.

The processor 160 may display an index UI (e.g., a scroll bar) 410 for screen movement based on index information, in the second region 112 of the display. The second region 112 may be a side surface region (e.g., a part of a right side) of the display.

The index UI 410 may include a scroll box 411 capable of being moved by the user's input. When the scroll box 411 is moved, the content displayed in the first region 111 may be changed depending on the movement distance.

The processor 160 may display a reception region 412a and a non-reception region 413a in the index UI 410. For example, the processor 160 may display the reception region 412a in the index UI in a first color (e.g., white), and may display the non-reception region 413a in the index UI 410 in a second color (e.g., gray). The reception region 412a may be a region corresponding to the first portion of content stored in the memory 170 inside the electronic device 101.

In a second screen 402, when a user input 450 occurs in the index UI 410, the processor 160 may change the content displayed in the first region 111 in response to the user input 450. For example, when the scroll box 411 is moved within the reception region 412a by the user input 450, the processor 160 may change content displayed in the first region 111, using the first portion of the content stored in the memory 170 inside the electronic device 101.

In a third screen 403, when the scroll box 411 is moved to the non-reception region 413a by the user input 450, data of corresponding content may not be stored in the memory 170 inside the electronic device 101. In this case, the processor 160 may make a request for content that is not transmitted to the external server 102, using the index information about a point (user selection point) where the scroll box 411 is moved (stopped).

According to various embodiments, when the scroll box 411 is moved to the non-reception region 413a by the user input 450, the processor 160 may display a preset screen in the first region 111 until the processor 160 receives the corresponding content (second portion) from the external server 102. For example, a message indicating that content is being transmitted may be displayed. For another example, an index notification indicator 415 may be displayed to be greater than the reception region 412a. Additional information about the screen displayed in the first region 111 may be provided through FIG. 7.

In a fourth screen 404, the processor 160 may display at least part of the second portion of the content received from the external server 102, in the first region 111 of the display 110. The second portion may be data corresponding to a point (user selection point) at which the scroll box 411 is stopped.

The processor 160 may display the reception region 412b corresponding to the second portion of the content in the index UI 410. The non-reception region 413a before the second portion is received may be divided into a first sub non-reception region 413b and a second sub non-reception region 413c, by the reception region 412b.

Figure 5:
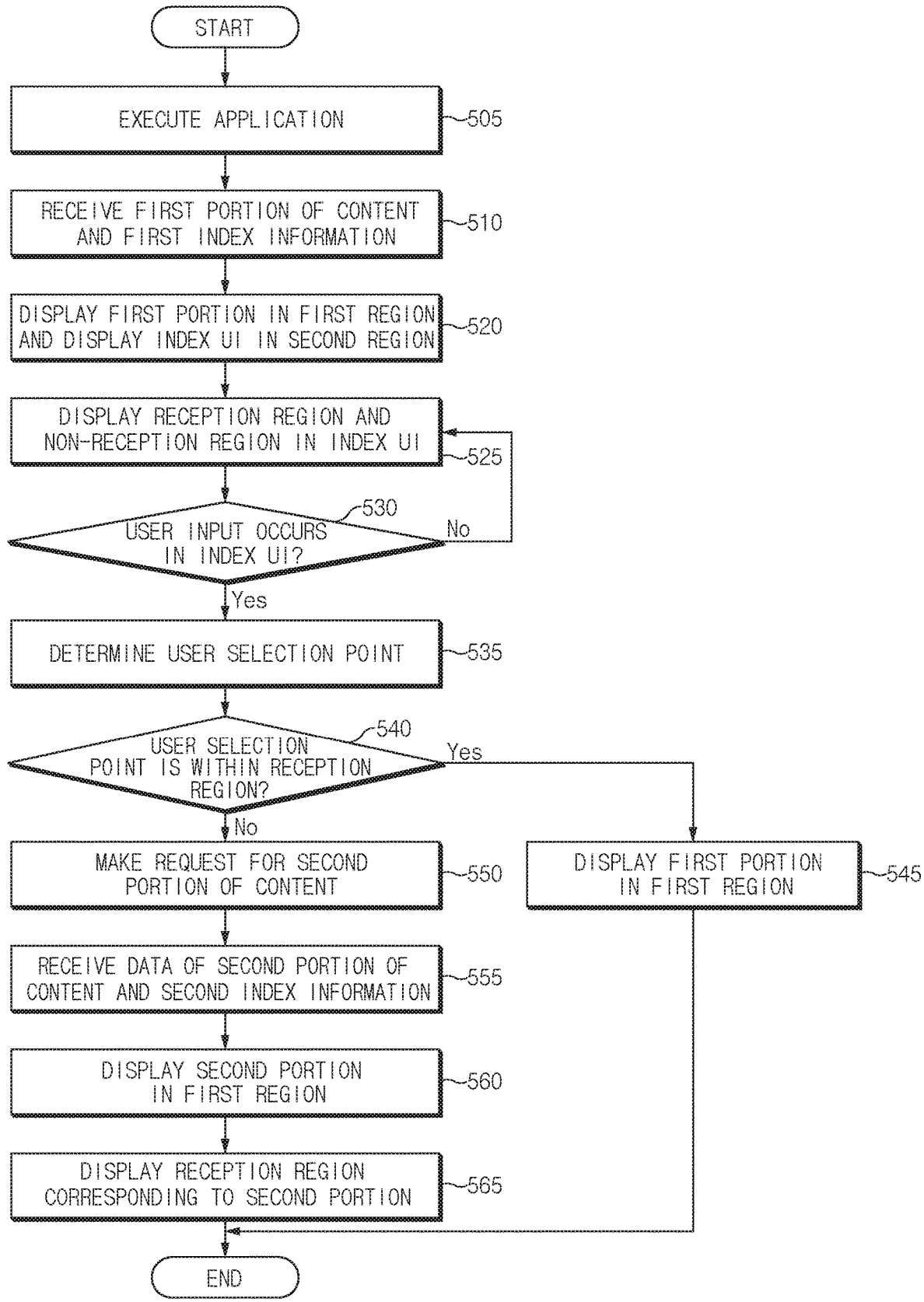
FIG. 5 is a flowchart illustrating a content displaying method for displaying index information about a part of content according to various embodiments.

FIG. 5 is a flowchart illustrating a content displaying method for displaying index information about a part of content according to various embodiments.

Referring to FIG. 5, in operation 505, the processor 160 may execute an application that receives and processes content (e.g., texts, images, or videos) from the external server 102. According to an embodiment, the content may be data sorted depending on a specified condition. For example, the content may be data sorted depending on criteria such as a time, score, and price.

In operation 510, the processor 160 may receive a first portion of content and first index information about a part of the content, from the external server 102.

The first index information may include not only index information corresponding to the first portion of the content, but also index information about the content stored in the server 102 in succession to the first portion. Also, the first index information may include metadata about a part of the content stored in the external server 102. For example, when SNS messages from 2007 to 2017 are stored in the server 102, the processor 160 may receive SNS messages in 2017 as a first portion, and may receive the first index information including metadata extracted from each of the SNS messages of 2015 to 2017.

In operation 520, the processor 160 may display at least part of the received first portion in the first region 111 of the display 110 and may display an index UI (e.g., a scroll bar) for screen movement in the second region 112 of the display 110 based on the first index information. For example, the first region 111 may be a central region other than a part of the side surface of the display 110. The second region 112 may be a side region (e.g., a part of a right side or a part of a lower side) of the display 110.

In operation 525, the processor 160 may display a reception region and a non-reception region in the index UI. For example, the processor 160 may display the reception region in the index UI in a first color (e.g., white), and may display the non-reception region in the index UI in a second color (e.g., gray). The processor 160 may display a region corresponding to the first portion of the index UI in a first color (e.g., white) set for the reception region.

In operation 530, the processor 160 may determine whether a specified user input occurs in the index UI. For example, the user input may be an input to touch and move a scroll box on a scroll bar and to terminate the touch.

In operation 535, the processor 160 may determine the user selection point determined by the user input. The user selection point may include information about the location of content to be displayed by a user, in the first region 111 of the display 110 through the index UI.

For example, the user selection point may be index information corresponding to a point at which the scroll box is stopped when the user touches and moves a scroll box in the index UI, and then terminates the touch.

In operation 540, the processor 160 may determine whether the user selection point is within the reception region.

In operation 545, when the user selection point is within the reception region, the processor 160 may display the corresponding content, using the first portion stored in the memory 170 inside the electronic device 101.

In operation 550, when the user selection point is out of the reception region (when the user selection point is within the non-reception region), the processor 160 may make a request for data for the second portion of the content to the external server 102. The second portion may be data corresponding to the user selection point.

In operation 555, the processor 160 may receive data for the second portion of content corresponding to the user selection point and second index information about the second portion of content, from the external server 102.

The second portion may be data that is not continuous with data of the first portion of the content received in operation 510. For example, the first portion may be SNS messages uploaded in 2017. The second portion may be SNS messages uploaded in 2015. SNS messages separately uploaded in 2016 may be stored in the external server 102 between the first portion and the second portion.

According to an embodiment, the second index information may include not only index information corresponding to the second portion of the content, but also index information about the content stored in a server 102 in succession to the second portion. For example, when SNS messages from 2007 to 2017 are stored in the server 102, the processor 160 may receive SNS messages in 2017 as a first portion, and may receive SNS messages in 2015 as a second portion. In addition, the processor 160 may receive second index information including metadata extracted from each of the SNS messages from 2013 to 2015.

In operation 560, the processor 160 may display at least part of the second portion received from the external server 102, in the first region 111 of the display 110.

In operation 565, the processor 160 may display a region corresponding to the second portion, in the index UI, as a reception region. For example, the processor 160 may change the region, which corresponds to the second portion, in the index UI from gray set for the non-reception region to white set for the reception region.

According to various embodiments, the processor 160 may change the shape of the index UI based on the first index information and the second index information. For example, the processor 160 may reduce the sizes of the reception region and the non-reception region, which have been previously displayed, by reflecting the index region increased by the second index information.

According to various embodiments, a content displaying method performed in an electronic device may include receiving a first portion of content capable of being displayed through a display, and index information of the content from an external server, displaying at least part of the first portion in a first region of the display and displaying a user interface for content movement based on the index information in a second region of the display, determining whether a specified user input occurs in the user interface, making a request for a second portion of the content corresponding to the user input to the external server when the specified user input occurs in the user interface, receiving the second portion from the external server, and displaying at least part of the second portion in the first region of the display.

According to various embodiments, the receiving of the second portion may include receiving additional index information that is continuous to the index information together with the second portion.

According to various embodiments, the receiving of the second portion may include changing the user interface based on the index information and the additional index information.

According to various embodiments, the receiving of the user interface may include displaying a data receiving region corresponding to the first portion in the user interface. The making of the request for the second portion of the content may include determining a user selection point in the content based on the user input, and making a request for the second portion corresponding to the user selection point to the external server when the user selection point is out of the data receiving region.

Figure 6:
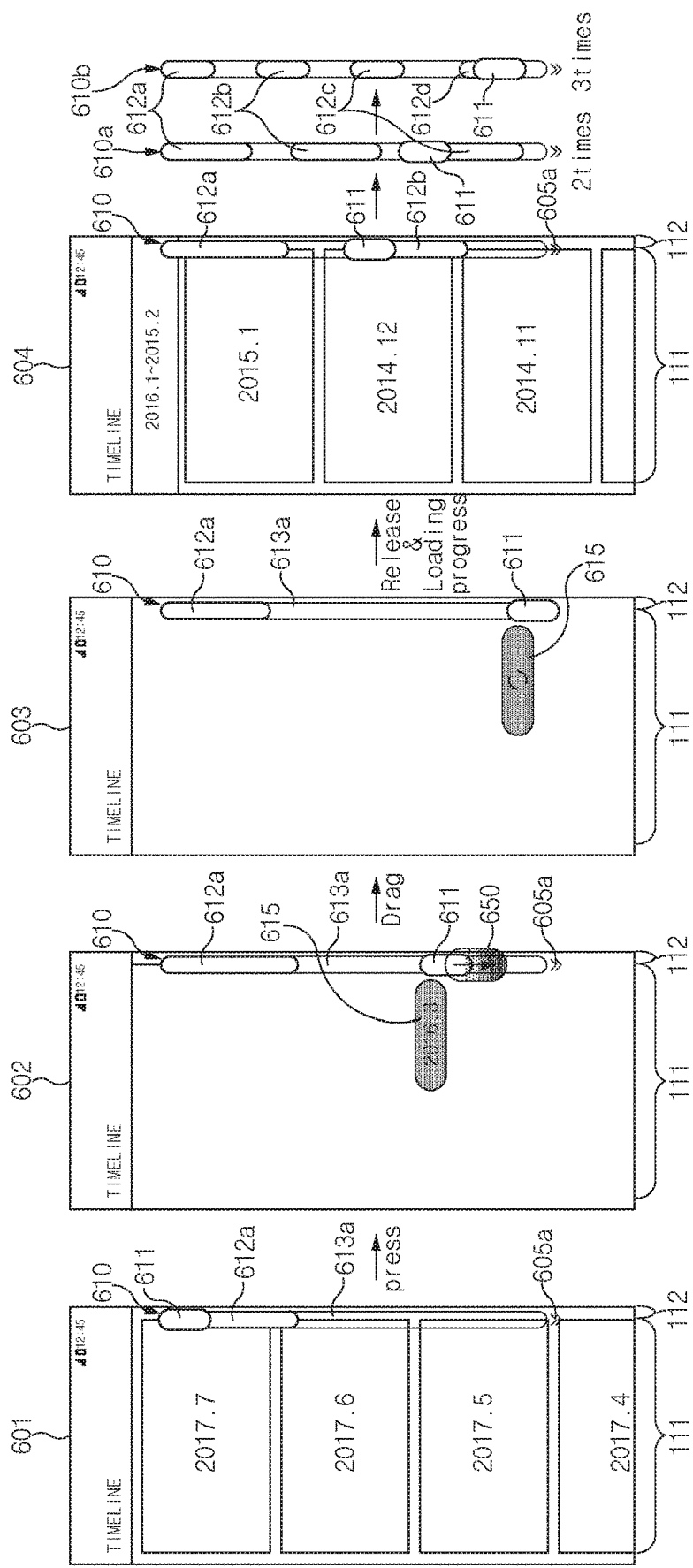
FIG. 6 is an exemplary view of a screen of displaying index information on a part of content according to various embodiments.

FIG. 6 is an exemplary view of a screen of displaying index information on a part of content according to various embodiments. However, FIG. 6 is exemplary, and the disclosure is not limited thereto.

Referring to FIG. 6, in a first screen 601, the processor 160 may display a first portion of content received from the external server 102, in the first region 111 of a display. The processor 160 may preferentially receive a first portion, which is a part of content stored in the external server 102, and may provide the first portion to a user. The first region 111 may be a central region of the display.

The processor 160 may display an index UI (e.g., a scroll bar) 610 for screen movement based on first index information, in the second region 112 of the display. The second region 112 may be a side surface region (e.g., a part of a right side) of the display.

The first index information may include not only index information corresponding to the first portion of the content, but also index information about the content stored in the server 102 in succession to the first portion. The first index information may include metadata about a part of the content stored in the external server 102.

The index UI 610 may include a scroll box 611 capable of being moved by the user's input. When the scroll box 611 is moved, the content displayed in the first region 111 may be changed depending on the movement distance.

The processor 160 may display a reception region 612a and a non-reception region 613a in the index UI 610. For example, the processor 160 may display the reception region 612a in the index UI in a first color (e.g., white), and may display the non-reception region 613a in the index UI 610 in a second color (e.g., gray). The reception region 612a may be a region corresponding to the first portion of content stored in the memory 170 inside the electronic device 101.

According to various embodiments, the processor 160 may display an additional content indicator 605a in the index UI 610. The additional content indicator 605a may be an indication indicating that the received first index information is index information about a part of the content stored in the external server 102.

In a second screen 602, when a user input 650 occurs in the index UI 610, the processor 160 may change the content displayed in the first region 111 in response to the user input 650. When the scroll box 611 is moved to the non-reception region 613a by the user input 650, data of corresponding content may not be stored in the memory 170 inside the electronic device 101. In this case, the processor 160 may make a request for content that is not transmitted to the external server 102, using the index information about a point (user selection point) where the scroll box 611 is moved (stopped).

In a third screen 603, when the user input 650 moves to the end of the non-reception region 613a indicated by the first index information, the processor 160 may make a request for content that has not been transmitted to the external server 102, using index information about a point (an end point of the non-reception region 613a) where the scroll box 611 is moved (stopped). In an embodiment, the processor 160 may indicate that content is being loaded (received), on the index notification indicator 615.

In a fourth screen 604, the processor 160 may display at least part of the second portion of the content received from the external server 102, in the first region 111 of the display 110. The second portion may be data corresponding to a point (the user selection point or end point of the non-reception region 613a) at which the scroll box 611 is stopped.

The processor 160 may display a region corresponding to the second portion of the content in the index UI 610, as the reception region 612b.

According to various embodiments, the processor 160 may change the size of the reception region 612a, based on the first index information and the second index information. For example, the processor 160 may reduce the size of the reception region 612a based on a ratio of an index region corresponding to the first portion to the entire index region increased by the second index information.

In an index UI 610a, when additionally receiving third index information through a separate user input, the processor 160 may reduce the size of the reception region 612a based on a ratio of the index region corresponding to the previously-received first portion to the index regions of content capable of being transmitted, due to the first to third index regions. The processor 160 may reduce the size of the reception region 612b based on a ratio of the index region corresponding to the previously-received second portion to the index regions of content capable of being transmitted, due to the first to third index regions.

In an index UI 610b, when additionally receiving fourth index information through a separate user input, the processor 160 may reduce the size of the reception region 612a based on a ratio of the index region corresponding to the previously-received first portion to the index regions of content capable of being transmitted, due to the first to fourth index regions. The processor 160 may reduce the size of the reception region 612b based on a ratio of the index region corresponding to the previously-received second portion to the index regions of content capable of being transmitted, due to the first to fourth index regions. The processor 160 may reduce the size of the reception region 612c based on a ratio of the index region corresponding to the previously-received third portion to the index regions of content capable of being transmitted, due to the first to fourth index regions.

Figure 7:
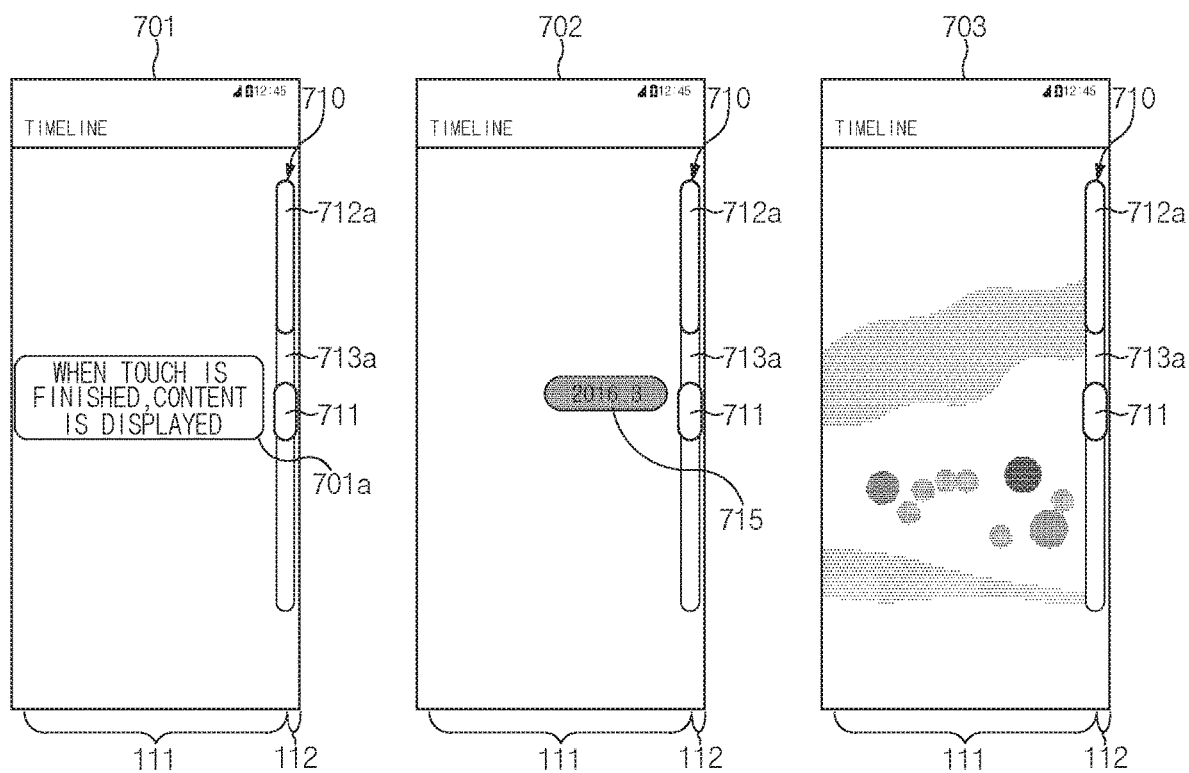
FIG. 7 is an exemplary view of a screen of a display before additional content is received, according to various embodiments.

FIG. 7 is an exemplary view of a screen of a display before additional content is received, according to various embodiments. FIG. 7 is, but is not limited to, only an example.

Referring to FIG. 7, in screens 701 to 703, when a scroll box 711 is moved to a non-reception region 713a by a user input 750, the processor 160 may display a preset screen in the first region 111 until the processor 160 receives the corresponding additional content from the external server 102.

In screen 701, when the user input is terminated, the processor 160 may display a message 701a providing a notification that additional content is to be displayed. For example, the processor 160 may display a message 701a in the first region 111, "when a touch is finished, content is displayed."

In screen 702, the processor 160 may enlarge and display an index notification indicator 715. For example, when the scroll box 711 is within a reception region 712a, the processor 160 may display the index notification indicator 715 in a first size. When the scroll box 711 moves to the non-reception region 713a by the user input 750, the processor 160 may display the index notification indicator 415 in a second size greater than the first size.

In screen 703, the processor 160 may blur the first region 111. For example, when the scroll box 711 moves to the non-reception region 713a, the processor 160 may blur the first region 111. As the scroll box 711 is farther from a reception region 712a, the processor 160 may increase the degree of blurring. When the user input 750 is terminated and then data of the second portion of the content is received, the processor 160 may gradually reduce the blur effect such that a part of the second portion is displayed in the first region 111.

Figure 8:
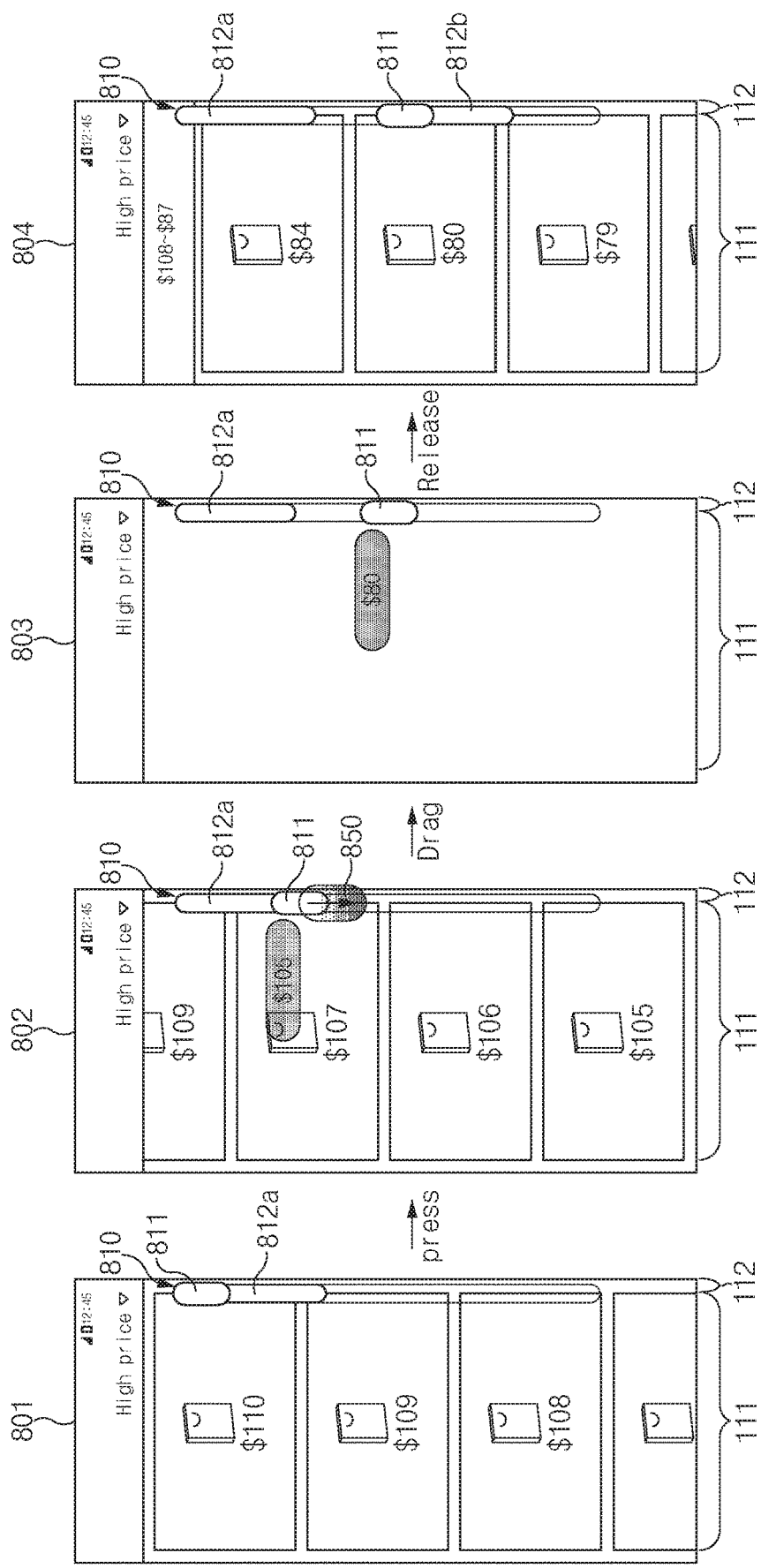
FIG. 8 is an exemplary view of a screen of arranging content based on a price of a product according to various embodiments.

FIG. 8 is an exemplary view of a screen of arranging content based on a price of a product according to various embodiments.

Referring to FIG. 8, the external server 102 may provide the electronic device 101 with content arranged depending on a specified criterion. For example, the external server 102 may include a list of various products. Each product list may include the image and price information of each product.

The electronic device 101 may request the external server 102 to sequentially transmit the content arranged based on the price of the product, depending on default settings or in response to a user input.

In a first screen 801, the processor 160 may display a first portion (e.g., products with the highest price) of content received from the external server 102, in the first region 111 of a display. The processor 160 may preferentially receive a part of content and then may provide the part of content to a user. In this way, the speed at which data is displayed may be faster.

The processor 160 may display an index UI (e.g., a scroll bar) 810 for screen movement based on index information, in the second region 112 of the display. In an embodiment, index information may include metadata for the entire product list stored in the external server 102. In another embodiment, the index information may include the metadata for a part of the product list stored in the external server 102. The user may identify the relative positions of products, which are being displayed in the first region 111, through an index UI (e.g., scroll bar) 810.

The processor 160 may display a reception region 812*a* and a non-reception region in the index UI 810. The reception region 812*a* may be a region corresponding to the first portion of content stored in the memory 170 inside the electronic device 101.

In a second screen 802, when a user input 850 occurs in the index UI 810, the processor 160 may change the content displayed in the first region 111 in response to the user input 850. For example, when the scroll box 811 is moved within the reception region 812*a* by the user input 850, the processor 160 may change content displayed in the first region 111, using the content stored in the memory 170 inside the electronic device 101.

In a third screen 803, when the scroll box 811 is moved to the non-reception region by the user input 850, the processor 811 may make a request for content that is not transmitted to the external server 102, using the index information about a point (user selection point) where the scroll box 811 is moved (stopped).

In a fourth screen 804, the processor 160 may display at least part of the second portion of the scroll content received from the external server 102, in the first region 111 of the display 110. The second portion may include images and price information about products having a lower price than products of the first portion.

The processor 160 may display a region corresponding to the second portion of the content in the index UI 810, as the reception region 812*b*.

Figure 9:
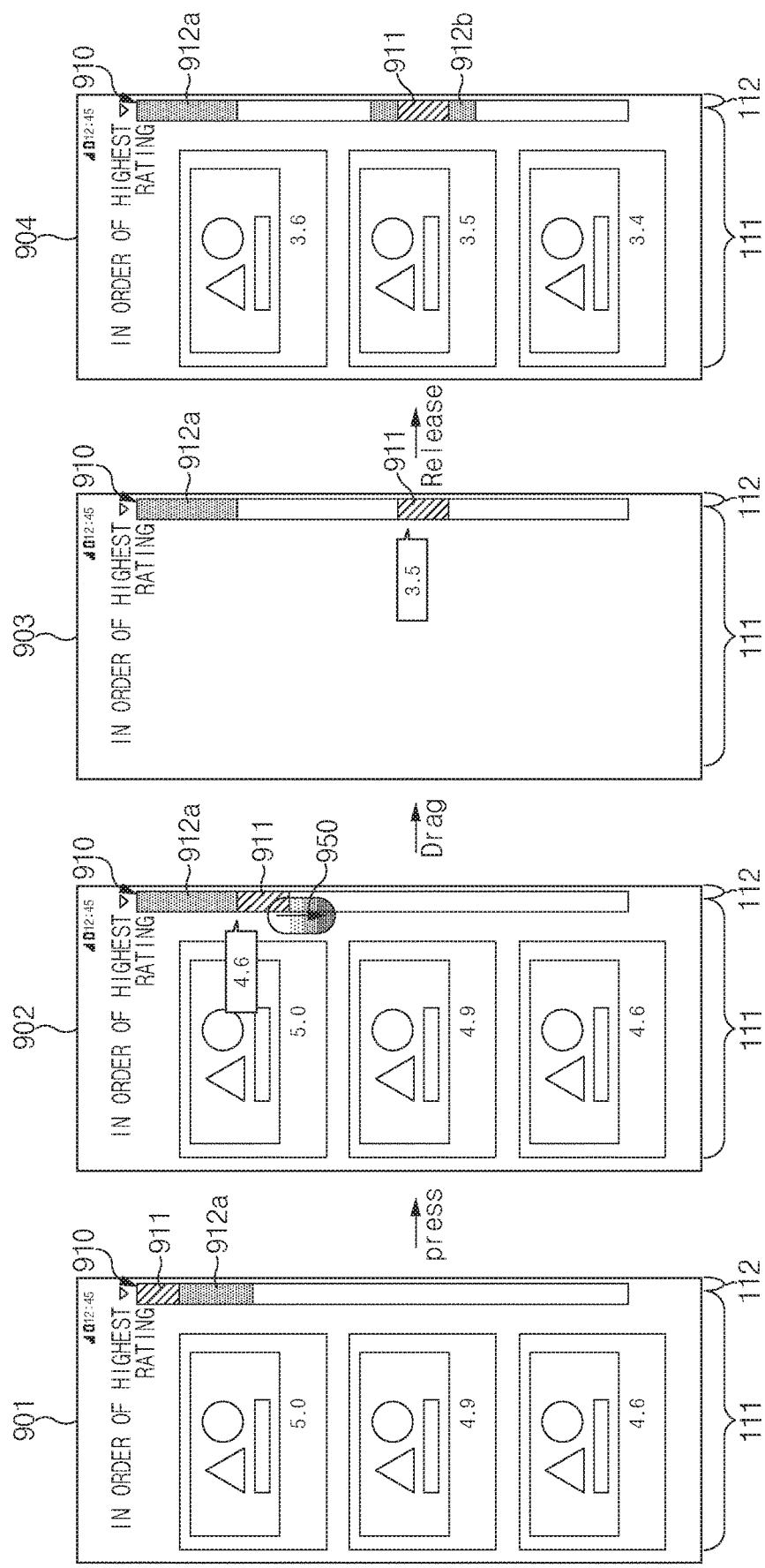
FIG. 9 is an exemplary view of a screen of arranging content based on a score according to various embodiments.

FIG. 9 is an exemplary view of a screen of arranging content based on a score according to various embodiments.

Referring to FIG. 9, the external server 102 may provide the electronic device 101 with content arranged depending on a specified criterion. For example, the external server 102 may include a list of digital products such as various music or movies. Each list may include score information of each digital product.

The electronic device 101 may request the external server 102 to sequentially transmit the content arranged based on the score of the digital product, depending on default settings or in response to a user input.

In a first screen 901, the processor 160 may display a first portion (e.g., digital products with the highest score) of content received from the external server 102, in the first region 111 of a display. The processor 160 may preferentially receive a part of content and then may provide the part of content to a user. In this way, the speed at which data is displayed may be faster.

The processor 160 may display an index UI (e.g., a scroll bar) 910 for screen movement based on index information, in the second region 112 of the display. In an embodiment, index information may include metadata for the entire digital product list stored in the external server 102. In another embodiment, the index information may include the metadata for a part of the digital product list stored in the external server 102.

The user may identify the relative positions of products, which are being displayed in the first region, through the index UI (e.g., scroll bar) 910.

The processor 160 may display a reception region 912*a* and a non-reception region in the index UI 910. The reception region 912*a* may be a region corresponding to the first portion of content stored in the memory 170 inside the electronic device 101.

In a second screen 902, when a user input 950 occurs in the index UI 910, the processor 160 may change the content displayed in the first region 111 in response to the user input 950. For example, when the scroll box 911 is moved within the reception region 912*a* by the user input 950, the processor 160 may change content displayed in the first region 111, using the content stored in the memory 170 inside the electronic device 101.

In a third screen 903, when the scroll box 911 is moved to the non-reception region by the user input 950, the processor 911 may make a request for content that is not transmitted to the external server 102, using the index information about a point (user selection point) where the scroll box 911 is moved (stopped).

In a fourth screen 904, the processor 160 may display at least part of the second portion of the scroll content received from the external server 102, in the first region 111 of the display 110. The second portion may include images of products having a lower score than digital products of the first portion. The processor 160 may display a region corresponding to the second portion of the content in the index UI 910, as the reception region 912*b*.

Figure 10:
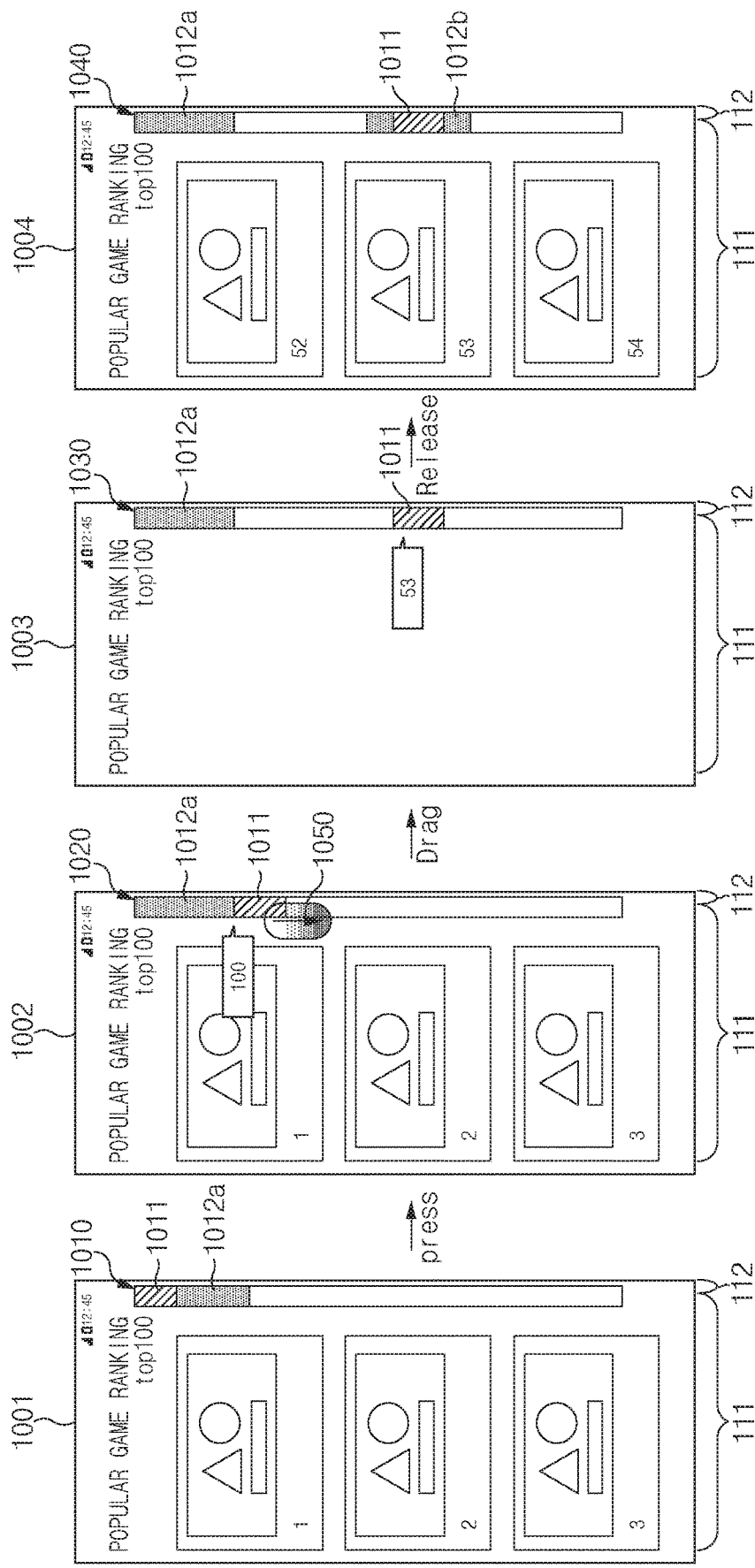
FIG. 10 is an exemplary view of a screen of arranging content based on ranking according to various embodiments.

FIG. 10 is an exemplary view of a screen of arranging content based on ranking according to various embodiments.

Referring to FIG. 10, the external server 102 may provide the electronic device 101 with content arranged depending on a specified criterion. For example, the external server 102 may include a list of games capable of being executed by the electronic device 101. Each list may include images, videos, descriptions, and the like of each game.

The electronic device 101 may request the external server 102 to sequentially transmit the content arranged based on the ranking (popularity) of a game, depending on default settings or in response to a user input.

In a first screen 1001, the processor 160 may display a part (e.g., games having first to third game popularities) of a first portion (e.g., games having 1 to 100 game popularity rankings) of content received from the external server 102, in the first region 111 of a display. The processor 160 may preferentially receive a part of content and then may provide the part of content to a user. In this way, the speed at which data is displayed may be faster.

The processor 160 may display an index UI (e.g., a scroll bar) 1010 for screen movement based on index information, in the second region 112 of the display. In an embodiment, index information may include metadata for the entire game list stored in the external server 102. In another embodiment, the index information may include the metadata for a part of the game list stored in the external server 102. The user may identify the relative positions of games, which are being displayed in the first region, through an index UI (e.g., scroll bar) 1010.

The processor 160 may display a reception region 1012*a* and a non-reception region in the index UI 1010. The reception region 1012*a* may be a region corresponding to the first portion of content stored in the memory 170 inside the electronic device 101.

In a second screen 1002, when a user input 1050 occurs in the index UI 1010, the processor 160 may change the content displayed in the first region 111 in response to the user input 1050. For example, when the scroll box 1011 is moved within the reception region 1012*a* by the user input 950, the processor 160 may change content displayed in the first region 111, using the content stored in the memory 170 inside the electronic device 101.

In a third screen 1003, when the scroll box 1011 is moved to the non-reception region by the user input 1050, the processor 1011 may make a request for content that is not transmitted to the external server 102, using the index information about a point (user selection point) where the scroll box 1011 is moved (stopped).

In a fourth screen 1004, the processor 160 may display at least part of the second portion of the scroll content received from the external server 102, in the first region 111 of the display. The second portion may include images, videos, and descriptions of games having lower popularity rankings than games of the first portion.

The processor 160 may display a region corresponding to the second portion of the content in the index UI 1010, as the reception region 1012*b*.

Figure 11:
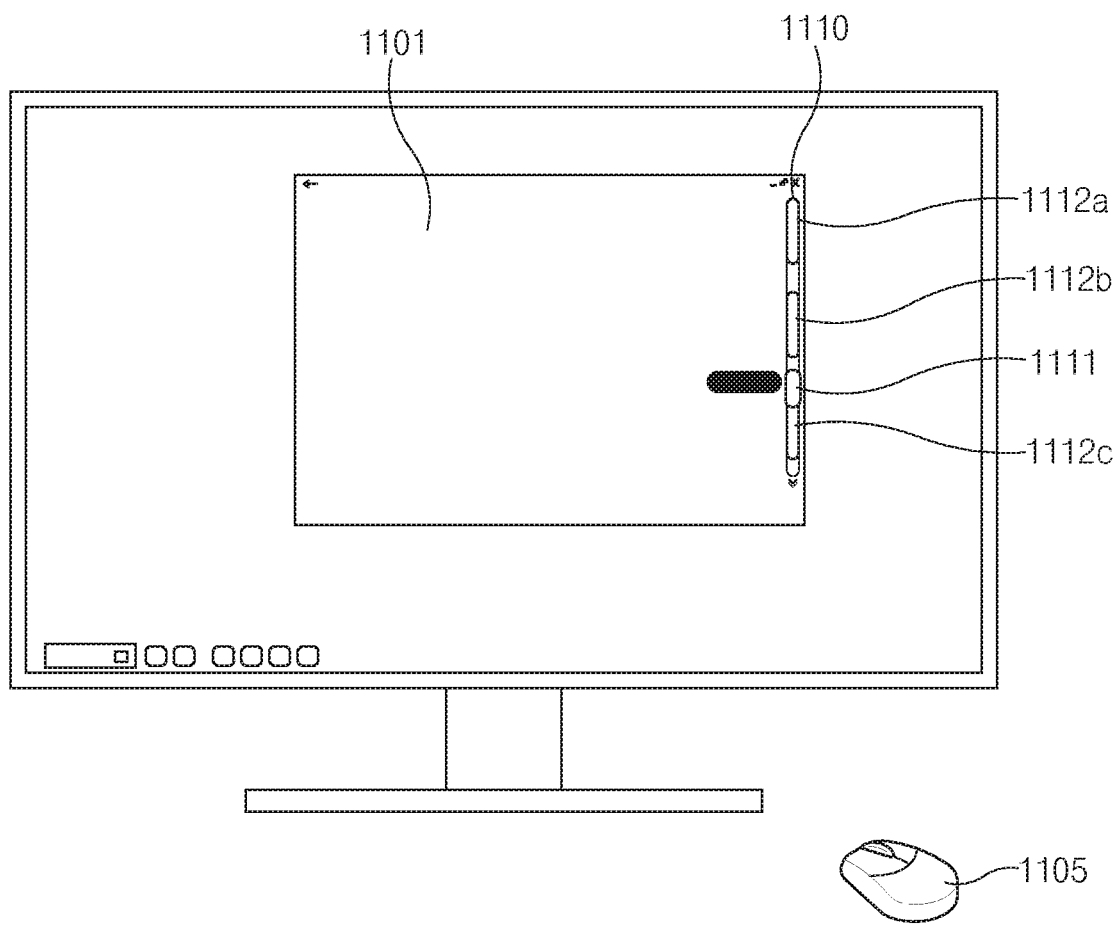
FIG. 11 is an exemplary view of a screen of displaying index information in response to a mouse input according to various embodiments.

FIG. 11 is an exemplary view of a screen of displaying index information in response to a mouse input according to various embodiments. However, FIG. 11 is exemplary, and the disclosure is not limited thereto.

Referring to FIG. 11, when the electronic device 101 is, for example, a laptop PC or a desktop PC, the processor 160 may request and display content from the external server 102 in response to the input of the interworking mouse device 1105.

When a scroll box 1111 in a scroll bar 1110 is moved within reception regions 1112*a*, 1112*b*, and 1112*c* by the click and drag input of the mouse device 1105, the processor 160 may display content in the first region 1101 based on the content stored in the memory 170.

When the scroll box 1111 is moved to non-reception regions by the click and drag input of the mouse device 1105, the processor 160 may request the external server 102 to transmit the corresponding content.

Figure 12:
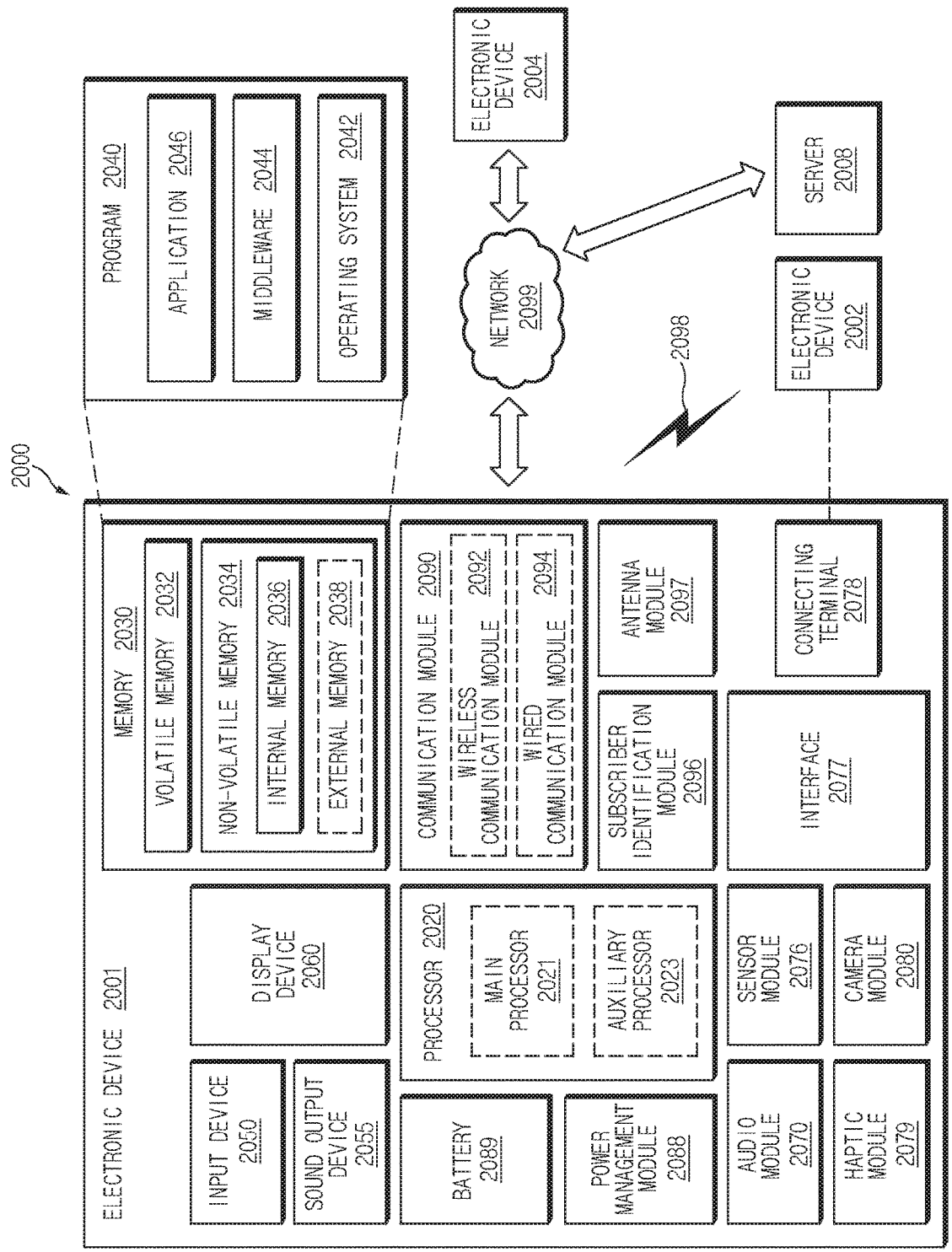
FIG. 12 is a block diagram of an electronic device in a network environment according to various embodiments.

FIG. 12 is a block diagram of an electronic device 2001 in a network environment 2000, according to various embodiments.

Referring to FIG. 12, the electronic device 2001 (e.g., the electronic device 101 of FIG. 1) in the network environment 2000 may communicate with an electronic device 2002 over a first network 2098 (e.g., a short range wireless communication network) or may communicate with an electronic device 2004 or a server 2008 over a second network 2099 (e.g., a long distance wireless communication network). According to an embodiment, the electronic device 2001 may communicate with the electronic device 2004 through the server 2008. According to an embodiment, the electronic device 2001 may include a processor 2020, a memory 2030, an input device 2050, a sound output device 2055, a display device 2060, an audio module 2070, a sensor module 2076, an interface 2077, a haptic module 2079, a camera module 2080, a power management module 2088, a battery 2089, a communication module 2090, a subscriber identification module 2096, or an antenna module 2097. In any embodiment, at least one (e.g., the display device 2060 or the camera module 2080) of the components may be omitted from the electronic device 2001, or one or more other components may be further included in the electronic device 2001. In any embodiment, some of the components may be implemented with a single integrated circuit. For example, the sensor module 2076 (e.g., a fingerprint sensor, an iris sensor, or an illumination sensor) may be embedded in the display device 2060 (e.g., a display).

The processor 2020 may execute, for example, software (e.g., a program 2040) to control at least one other component (e.g., a hardware or software component) of the electronic device 2001 connected to the processor 2020, and may perform various data processing or operations. According to an embodiment, as at least a part of the data processing or operations, the processor 2020 may load a command or data received from any other component (e.g., the sensor module 2076 or the communication module 2090) to a volatile memory 2032, may process the command or data stored in the volatile memory 2032, and may store processed data in a nonvolatile memory 2034. According to an embodiment, the processor 2020 may include a main processor 2021 (e.g., a central processing unit or an application processor) and an auxiliary processor 2023 (e.g., a graphic processing device, an image signal processor, a sensor hub processor, or a communication processor), which may be operated independently of or together with the main processor 2021. Additionally or alternatively, the auxiliary processor 2023 may be configured to use lower power than the main processor 2021 or to be specialized for a specified function. The auxiliary processor 2023 may be implemented separately from the main processor 2021 or may be implemented as a part of the main processor 2021.

The auxiliary processor 2023 may control at least a part of a function or states associated with at least one component (e.g., the display device 2060, the sensor module 2076, or the communication module 2090) of the electronic device 2001, for example, instead of the main processor 2021 while the main processor 2021 is in an inactive (e.g., sleep) state and together with the main processor 2021 while the main processor 2021 is in an active (e.g., an application execution) state. According to an embodiment, the auxiliary processor 2023 (e.g., an image signal processor or a communication processor) may be implemented as a part of any other component (e.g., the camera module 2080 or the communication module 2090) which is functionally (or operatively) associated with the auxiliary processor 2023. The memory 2030 may store various data which are used by at least one component (e.g., the processor 2020 or the sensor module 2076) of the electronic device 2001. The data may include, for example, software (e.g., the program 2040), or input data or output data associated with a command of the software. The memory 2030 may include the volatile memory 2032 or the nonvolatile memory 2034.

The program 2040 may be stored in the memory 2030 as software, and may include, for example, an operating system 2042, a middleware 2044, or an application 2046.

The input device 2050 may receive a commands or data which will be used by a component (e.g., the processor 2020) of the electronic device 2001, from the outside (e.g., a user) of the electronic device 2001. The input device 2050 may include, for example, a microphone, a mouse, or a keyboard.

The sound output device 2055 may output a sound signal to the outside of the electronic device 2001. The sound output device 2055 may include, for example, a speaker or a receiver. The speaker may be used for a general purpose such as multimedia play or recording play, and the receiver may be used to receive an incoming call. According to an embodiment, the receiver may be implemented separately from the speaker or may be implemented as a part of the speaker.

The display device 2060 may visually provide information to the outside (e.g., the user) of the electronic device 2001. The display device 2060 may include, for example, a display, a hologram device, or a control circuit for controlling a projector and a corresponding device. According to an embodiment, the display device 2060 may include a touch circuitry configured to sense a touch, or a sensor circuitry (e.g., a pressure sensor) configured to measure the strength of force generated by the touch.

The audio module 2070 may convert sound to an electrical signal, or reversely, may convert an electrical signal to sound. According to an embodiment, the audio module 2070 may obtain sound through the input device 2050, or may output sound through the sound output device 2055, or through an external electronic device (e.g., the electronic device 2002) (e.g., a speaker or a headphone) directly or wirelessly connected with the electronic device 2001.

The sensor module 2076 may sense an operation state (e.g., power or a temperature) of the electronic device 2001 or an external environment state (e.g., a user state), and may generate an electrical signal or a data value corresponding the sensed state. According to an embodiment, the sensor module 2076 may include, for example, a gesture sensor, a grip sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, or an illumination sensor.

The interface 2077 may support one or more specified protocols that may be used to directly and wirelessly connect the electronic device 2001 with an external electronic device (e.g., the electronic device 2002). According to an embodiment, the interface 2077 may include, for example, a high definition multimedia interface (HDMI), a universal serial bus (USB) interface, a secure digital (SD) card interface, or an audio interface.

A connection terminal 2078 may include a connector that may allow the electronic device 2001 to be physically connected with an external electronic device (e.g., the electronic device 2002). According to an embodiment, the connection terminal 2078 may include, for example, a HDMI connector, a USB connector, a SD card connector, or an audio connector (e.g., a headphone connector).

The haptic module 2079 may convert an electrical signal to a mechanical stimulation (e.g., vibration or movement) or an electrical stimulation which the user may perceive through the sense of touch or the sense of movement.

According to an embodiment, the haptic module 2079 may include, for example, a motor, a piezoelectric sensor, or an electrical stimulation device.

The camera module 2080 may photograph a still image and a video. According to an embodiment, the camera module 2080 may include one or more lenses, image sensors, image signal processors, or flashes (or electrical flashes).

The power management module 2088 may manage the power which is supplied to the electronic device 2001. According to an embodiment, the power management module 2088 may be implemented, for example, as at least a part of a power management integrated circuit (PMIC).

The battery 2089 may power at least one component of the electronic device 2001. According to an embodiment, the battery 2089 may include, for example, a primary cell not recharged, a secondary cell rechargeable, or a fuel cell.

The communication module 2090 may establish a direct (or wired) communication channel or a wireless communication channel between the electronic device 2001 and an external electronic device (e.g., the electronic device 2002, the electronic device 2004, or the server 2008) or may perform communication through the established communication channel. The communication module 2090 may include one or more communication processors which is operated independently of the processor 2020 (e.g., an application processor) and supports direct (or wired) communication or wireless communication. According to an embodiment, the communication module 2090 may include a wireless communication module 2092 (e.g., a cellular communication module, a short range wireless communication module, or a global navigation satellite system (GNSS) communication module) or a wired communication module 2094 (e.g., a local area network (LAN) communication module or a power line communication module). A corresponding communication module of such communication modules may communicate with an external electronic device over the first network 2098 (e.g., a short range communication network such as Bluetooth, Wi-Fi direct, or infrared data association (IrDA)) or the second network 2099 (e.g., a long distance communication network such as a cellular network, an Internet, or a computer network (e.g., LAN or WAN)). The above-described kinds of communication modules may be integrated in one component (e.g., a single chip) or may be implemented with a plurality of components (e.g., a plurality of chips) which are independent of each other.

According to an embodiment, the wireless communication module 2092 may distinguish and authenticate the electronic device 2001 within a communication network using user information stored in the subscriber identification module 2096.

The antenna module 2097 may include one or more antennas for transmitting or receiving signals or power to the outside. According to an embodiment, the communication module 2090 (e.g., the wireless communication module 2092) may transmit a signal to an external electronic device or receive a signal from an external electronic device through an antenna suitable for a communication method.

At least some of the components may be connected to each other through a communication scheme (e.g., a bus, a general purpose input and output (GPIO), a serial peripheral interface (SPI), or a mobile industry processor interface (MIP)) between peripheral devices and may exchange signals (e.g., commands or data) with each other.

According to an embodiment, a command or data may be transmitted or received (or exchanged) between the electronic device 2001 and the external electronic device 2004 through the server 2008 connecting to the second network 2099. Each of the electronic devices 2002 and 2004 may be a device, the kind of which is the same as or different from a kind of the electronic device 2001. According to an embodiment, all or a part of operations to be executed in the electronic device 2001 may be executed in one or more external devices of the external electronic devices 2002, 2004, or 2008. For example, in the case where the electronic device 2001 should perform any function or service automatically or in response to a request from the user or any other device, the electronic device 2001 may request one or more external electronic devices to perform at least a part of the function or service, instead of internally executing the function or service or additionally. The one or more external electronic devices which receive the request may execute at least a part of the function or service thus requested or an additional function or service associated with the request, and may provide a result of the execution to the electronic device 2001. The electronic device 2001 may process received result as it is or additionally, and may provide a result of the processing as at least a part of the response to the request. To this end, for example, a cloud computing, distributed computing, or client-server computing technology may be used.

According to various embodiments of the disclosure, an electronic device (e.g., the electronic device 101 of FIG. 1) may include a display (the display 110 of FIG. 1), a communication circuit transmitting and receiving data with an external server (e.g., the external server 102 of FIG. 1), a memory (e.g., the memory 170 of FIG. 1) storing data received through the communication circuit, and a processor (e.g., the processor 160 of FIG. 1) controlling the display, the communication circuit, and the memory. The processor may be configured to receive a first portion of content capable of being displayed through the display, and index information of the content from the external server, to display at least part of the first portion in a first region of the display, to display a user interface for content movement based on the index information, in a second region of the display, to make a request for a second portion of the content corresponding to the user input to the external server when a specified user input occurs in the user interface, and to display at least part of the second portion in the first region of the display.

According to various embodiments, the index information may include metadata for the entire content stored in the external server. The index information may include metadata for the first portion and metadata for another portion that is continuous to the first portion.

According to various embodiments, the processor may be configured to receive additional index information that is continuous to the index information together with the second portion. The processor may be configured to change the user interface based on the index information and the additional index information.

According to various embodiments, the processor may be configured to display a data receiving region corresponding to the first portion in the user interface. The processor may be configured to shrink the data receiving region based on the index information and the additional index information when receiving additional index information continuous to the index information together with the second portion. The processor may be configured to determine a user selection point in the content based on the user input, and to make a request for the second portion corresponding to the user selection point to the external server when the user selection point is out of the data receiving region.

According to various embodiments, the processor may be configured to display user guide words or an index corresponding to the user selection point in the first region when the user selection point is out of the data receiving region. The processor may be configured to display another portion of the first portion stored in the memory in the first region when the user selection point is within the data receiving region.

According to various embodiments, the processor may be configured to display a data receiving region corresponding to the second portion, in the user interface.

According to various embodiments, the content may be data arranged depending on at least one of a time, price, or score.

According to various embodiments, the user interface may be a scroll bar including a scroll box, and the specified user input may be an input starting moving the scroll box and terminating the movement.

According to various embodiments, the processor may be configured to divide the scroll bar into a plurality of sections based on the index information.

According to various embodiments, the user input may be at least one of a touch input, a mouse input, a gesture input, a pad input, and a touch pen input.

Each of components (e.g., a module or a program) according to various embodiments may include a single entity or a plurality of entities; some of the above-described corresponding sub components may be omitted, or any other sub component may be further included in various embodiments. Alternatively or additionally, some components (e.g., a module or a program) may be combined with each other so as to form one entity, such that the functions of the components may be performed in the same manner as before the combination. According to various embodiments, operations executed by modules, program modules, or other components may be executed by a successive method, a parallel method, a repeated method, or a heuristic method. Alternatively, at least some of the operations may be executed in another order or may be omitted, or any other operation may be added.

The invention claimed is:

1. An electronic device comprising:
   a display;
   a communication circuit configured to transmit and receive data with an external server;
   a memory configured to store data received through the communication circuit; and
   a processor configured to control the display, the communication circuit, and the memory,
   wherein the processor is further configured to:
     receive a first portion of content capable of being displayed through the display, and index information of the content from the external server,
     display at least part of the first portion in a first region of the display,
     display a user interface for content movement based on the index information, in a second region of the display, the user interface comprising a reception region and a non-reception region, the reception region indexing the content stored on the electronic device and the non-reception region differently colored from the reception region and indexing the content not stored on the electronic device,
     when a specified user input occurs in the non-reception region of the user interface, make a request for a second portion of the content corresponding to the user input to the external server, and display at least part of the second portion in the first region of the display.

2. The electronic device of claim 1, wherein the index information comprises metadata for the entire content stored in the external server.

3. The electronic device of claim 1, wherein the index information comprises metadata for the first portion and metadata for another portion that is continuous to the first portion.

4. The electronic device of claim 1, wherein the processor is further configured to:

receive additional index information that is continuous to the index information together with the second portion.

5. The electronic device of claim 4, wherein the processor is further configured to:

change the user interface based on the index information and the additional index information.

6. The electronic device of claim 1, wherein the processor is further configured to:

display a data receiving region corresponding to the first portion in the user interface.

7. The electronic device of claim 6, wherein the processor is further configured to:

when receiving additional index information continuous to the index information together with the second portion, shrink the data receiving region based on the index information and the additional index information.

8. The electronic device of claim 6, wherein the processor is further configured to:

determine a user selection point in the content based on the user input, and when the user selection point is out of the data receiving region, make a request for the second portion corresponding to the user selection point to the external server.

9. The electronic device of claim 8, wherein the processor is further configured to:

when the user selection point is out of the data receiving region, display user guide words or an index corresponding to the user selection point in the first region.

10. The electronic device of claim 8, wherein the processor is further configured to:

when the user selection point is within the data receiving region, display another portion of the first portion stored in the memory in the first region.

11. The electronic device of claim 1, wherein the processor is further configured to:

display a data receiving region corresponding to the second portion, in the user interface.

12. The electronic device of claim 1, wherein the content is data arranged depending on at least one of a time, price, or score.

13. The electronic device of claim 1, wherein the user interface is a scroll bar comprising a scroll box, and wherein the specified user input is an input starting movement of the scroll box and terminating the movement.

14. The electronic device of claim 13, wherein the processor is further configured to:

divide the scroll bar into a plurality of sections based on the index information.

15. The electronic device of claim 1, wherein the processor is further configured to:

display an index notification indicator on the first region of the display while waiting to receive the second portion from the external server based on the request for the second portion from the external server.

16. The electronic device of claim 1, wherein the reception region and the non-reception region are free of an index notification indicator.

17. A content displaying method performed in an electronic device, the method comprising:

receiving a first portion of content capable of being displayed through a display, and index information of the content from an external server;

displaying at least part of the first portion in a first region of the display and displaying a user interface for content movement based on the index information in a second region of the display, the user interface comprising a reception region and a non-reception region, the reception region indexing the content stored on the electronic device and the non-reception region differently colored from the reception region and indexing the content not stored on the electronic device;

determining whether a specified user input occurs in the non-reception region of the user interface;

when the specified user input occurs in the user interface, making a request for a second portion of the content corresponding to the user input to the external server;

receiving the second portion from the external server; and displaying at least part of the second portion in the first region of the display.

* * * * *